(Model.)
2 Sheets—Sheet 1.
W. DIBBLE.
BEE SWARMER.
No. 474,115. Patented May 3, 1892.
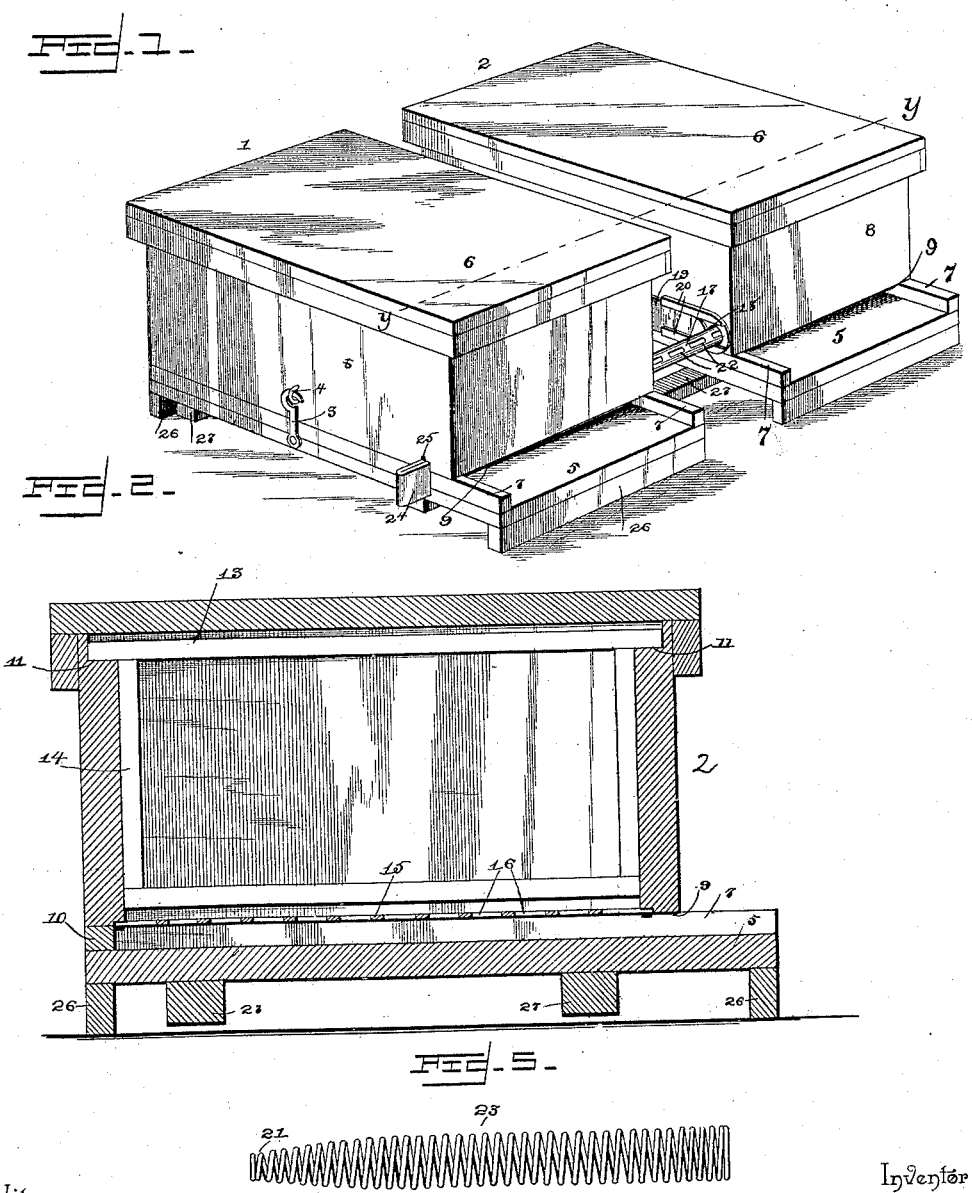
Witnesses
E. S. Duvall Jr.
H. F. Riley
Inventor
Wesley Dibble.
By his Attorneys,
C. A. Snow & Co.
THE NORRIS PETERS CO., PHOTO-LITHO., WASHINGTON, D. C.

(Model.) 2 Sheets—Sheet 2.
W. DIBBLE.
BEE SWARMER.
No. 474,115. Patented May 3, 1892.
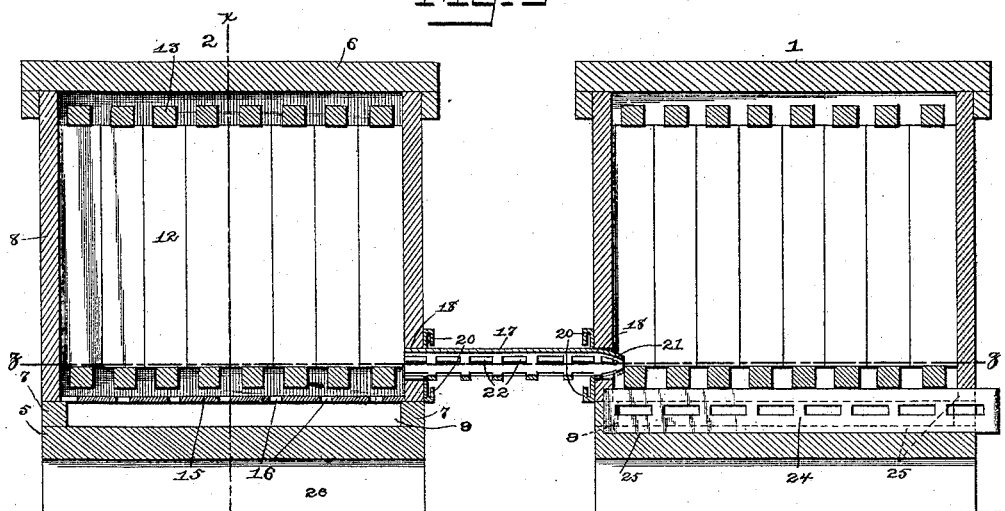
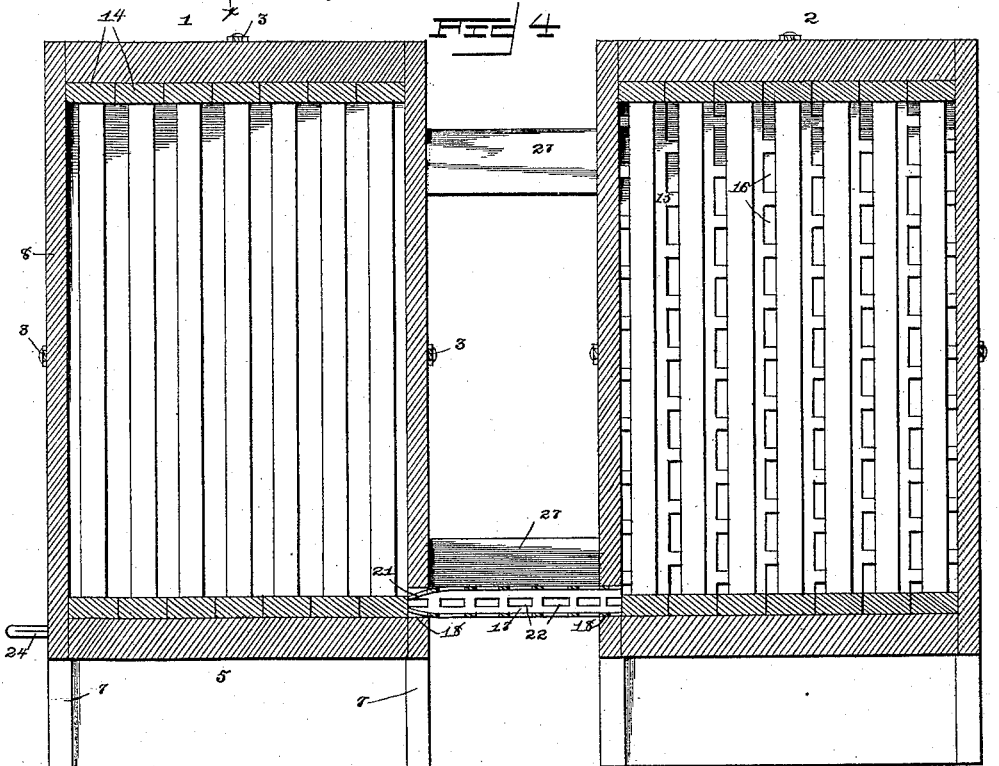
Witnesses
E. S. Duvall Jr.
H. F. Riley
Inventor
Wesley Dibble.
By his Attorneys,
C. A. Snow & Co.

UNITED STATES PATENT OFFICE.

WESLEY DIBBLE, OF MIDDLEBURG, NEW YORK.

BEE-SWARMER.

SPECIFICATION forming part of Letters Patent No. 474,115, dated May 3, 1892.

Application filed April 15, 1891. Serial No. 389,039. (Model.)

*To all whom it may concern:*

Be it known that I, WESLEY DIBBLE, a citizen of the United States, residing at Middleburg, in the county of Schoharie and State of New York, have invented a new and useful Improvement in Bee-Swarmers, of which the following is a specification.

The invention relates to improvements in bee-swarmers.

The object of the present invention is to improve the construction of hives and enable the same to be safely left unattended for a considerable time.

A further object of the invention is to conduct the queen-bee safely from the home hive to an adjacent empty one when the bees are ready to swarm.

The invention consists in the construction and novel combination and arrangement of parts hereinafter fully described, illustrated in the accompanying drawings, and pointed out in the claim hereto appended.

In the drawings, Figure 1 is a perspective view of a bee-swarmer constructed in accordance with this invention. Fig. 2 is a vertical longitudinal sectional view on line *x x* of Fig. 3. Fig. 3 is a vertical sectional view on line *y y* of Fig. 1, looking toward the front of the hive. Fig. 4 is a horizontal sectional view on line *z z* of Fig. 3. Fig. 5 is a detail perspective view of a modification of tubular conductor.

Referring to the accompanying drawings, 1 and 2 designate a pair of hives arranged adjacent to each other and each consisting of four vertical walls detachably secured by hooks and eyes 3 and 4 to a bottom board or base 5 and provided with a removable cover 6, which forms the top of the hive. The bottom board or base is provided along its side edges with strips 7, which form flanges and elevate the body 8 of the hive and forms a bee opening or entrance 9 at one end of each hive. The bottom boards are provided at the other ends of the hives with end strips 10, which connect the side strips 7 and close the hives at that end. The hive-bodies 8 have their end walls provided at their tops with recesses 11, which are adapted to support brood-frames 12 and to receive the extended ends of the top pieces 13. The side pieces 14 are sufficiently wide to form spaces between the top and bottom pieces of the brood-frames, and the said side pieces 14 fit closely together and prevent the brood-frames slipping or shifting their positions.

The home hive 2 is provided with a perforated bottom 15, which consists of a plate and is arranged just above the bee opening or entrance 9 and is provided with openings 16, sufficiently large to permit the passage of the bees, but small enough to prevent the queen-bee passing through them. When the bees are ready to swarm, they pass through the openings of the bottom and then pass out of the hive through the bee-opening 9. When the bees have left the home hive and the queen-bee finds herself confined, she endeavors to escape, and in doing so she passes through a tubular conductor 17 into the adjacent empty hive 1. The tubular conductor has its ends fitted in openings 18, which are arranged opposite each other in the adjacent inner side walls of the hives and which are closed when the tubular conductor is not in use by slides 19, arranged in guides 20 on the outer faces of the side walls. The tubular conductor is reversible and detachable or removable and is provided with a contracted end 21, which after the queen-bee has passed through prevents her return, and the said tubular conductor is provided with light-openings 22, which may be of sufficient size to enable the other bees to pass through and permit the escape of a bee should it get into the conductor, or use that as an exit. Tubular conductors 17 may be constructed of any desirable material which will afford light by openings or otherwise and may be either curved or angular in cross-section. The spiral spring 23 (seen in Fig. 5) will be found convenient. The contracted end 21 is placed in the hive to which the queen-bee is designed to be conducted.

The empty hive is provided at its bee-opening 9 with a slide 24, consisting of a plate which is arranged in kerfs 25 and which is provided with openings of a size to permit the passage of the drones and workers and prevent the exit of the queen-bee. The slide 24 may be employed instead of the bottom 15, and vice versa, and I have illustrated in the accompanying drawings one hive provided with a bottom and another having the slide.

Both the bottom and the slide prevent the queen-bee getting outside of the hive and becoming chilled. The perforated bottom 15 is arranged below the brood-frames and the tubular conductor is interposed between them and the adjacent bee-opening. The slide and the perforated bottom always remain in place in the hives, as shown. The bottom boards are provided at their ends with cross-bars 26 and are connected by bars 27.

What I claim is—

The combination, in a bee-swarmer, of the hives 1 and 2, each provided with a bee-entrance and being arranged adjacent to each other and provided with oppositely-disposed openings 18, the reversible and detachable tubular conductor connecting the openings 18 and having openings for light and provided with a contracted end, the brood-frames arranged in the hives, the bottom 15, arranged in the hive 2 beneath the brood-frames and above the bee-entrance and provided with openings 16, and a slide 24, provided with openings similar to those of the false bottom and arranged at the bee-entrance of the hive 1, substantially as described.

In testimony that I claim the foregoing as my own I have hereto affixed my signature in presence of two witnesses.

WESLEY DIBBLE.

Witnesses:
C. L. McBAIN,
D. D. HESS, Jr.